(12) United States Patent
Prast et al.

(10) Patent No.: US 8,475,572 B2
(45) Date of Patent: Jul. 2, 2013

(54) METHOD OF REMOVING AND SOLIDIFYING CARBON DIOXIDE FROM A FLUID STREAM AND FLUID SEPARATION ASSEMBLY

(75) Inventors: Bart Prast, Rijswijk (NL); Jakob Arie Cornelis Langerak, Rijswijk (NL); Marco Betting, Rijswijik (NL); Cornelis Antonie Tjeenk Willink, Rijswijk (NL)

(73) Assignee: Twister B.V. (NL)

( * ) Notice: Subject to any disclaimer, the term of this patent is extended or adjusted under 35 U.S.C. 154(b) by 376 days.

(21) Appl. No.: 12/811,072

(22) PCT Filed: Dec. 28, 2007

(86) PCT No.: PCT/NL2007/050710
§ 371 (c)(1),
(2), (4) Date: Sep. 30, 2010

(87) PCT Pub. No.: WO2009/084945
PCT Pub. Date: Jul. 9, 2009

(65) Prior Publication Data
US 2011/0016917 A1    Jan. 27, 2011

(51) Int. Cl.
*B01D 45/12* (2006.01)

(52) U.S. Cl.
USPC ............... 95/269; 95/290; 55/315; 55/396; 55/415; 62/602; 62/611; 62/637

(58) Field of Classification Search
USPC . 55/315, 394, 396, 456; 95/290, 269; 62/602, 62/611, 617, 637
See application file for complete search history.

(56) References Cited

U.S. PATENT DOCUMENTS 3,236,057 A    2/1966  Hashemi-Tafreshi
6,372,019 B1 *  4/2002  Alferov et al. .................... 95/29

(Continued)

FOREIGN PATENT DOCUMENTS

WO    WO0121286     3/2001
WO    WO03055575    7/2003

(Continued)

OTHER PUBLICATIONS

International Search Report in re: PCT Application No. PCT/NL2007/050710 dated Sep. 19, 2008, 4 pages.

(Continued)

*Primary Examiner* — Robert A Hopkins (57) ABSTRACT

The invention relates to a method of removing carbon dioxide from a fluid stream by a fluid separation assembly. The fluid separation assembly has a cyclonic fluid separator with a tubular throat portion arranged between a converging fluid inlet section and a diverging fluid outlet section and a swirl creating device. The separation vessel has a tubular section positioned on and in connection with a collecting tank. In the method, a fluid stream with carbon dioxide is provided. Subsequently, a swirling motion is imparted to the fluid stream so as to induce outward movement. The swirling fluid stream is then expanded such that components of carbon dioxide in a meta-stable state within the fluid stream are formed. Subsequently, the outward fluid stream with the components of carbon dioxide is extracted from the cyclonic fluid separator and provided as a mixture to the separation vessel. The mixture is then guided through the tubular section towards the collecting tank while providing processing conditions such that solid carbon dioxide is formed. Finally, solidified carbon dioxide is extracted.

21 Claims, 4 Drawing Sheets

U.S. PATENT DOCUMENTS 7,325,415 B2 * 2/2008 Amin et al. .................. 62/541
2002/0189443 A1 12/2002 McGuire

FOREIGN PATENT DOCUMENTS

| WO | WO03062725 | 7/2003 |
|---|---|---|
| WO | WO2007031476 | 3/2007 |

OTHER PUBLICATIONS

Notification of Transmittal of the International Preliminary Report on Patentability dated Apr. 16, 2010, 12 pages.

* cited by examiner

METHOD OF REMOVING AND SOLIDIFYING CARBON DIOXIDE FROM A FLUID STREAM AND FLUID SEPARATION ASSEMBLY

FIELD OF THE INVENTION

The invention relates to a method of removing carbon dioxide from a fluid stream. In particular, embodiments of the present invention relate to a method of removing carbon dioxide from a natural gas stream. The invention further relates to a fluid separation assembly.

BACKGROUND OF THE INVENTION

Natural gas from storage or production reservoirs typically contains carbon dioxide ($CO_2$). Such a natural gas is denoted as a "sour" gas. Another species denoted as "sour" in a fluid stream is hydrogen sulphide ($H_2S$). A fluid stream without any of aforementioned sour species is denoted as a "sweet" fluid.

$CO_2$ promotes corrosion within pipelines. Furthermore, in some jurisdictions, legal and commercial requirements with respect to a maximum concentration of $CO_2$ in a fluid stream may be in force. Therefore, it is desirable to remove $CO_2$ from a sour fluid stream.

Fluid sweetening processes, i.e. a process to remove a sour species like carbon dioxide from a fluid stream, are known in the art. Such processes typically include at least one of chemical adsorption, physical adsorption, low temperature distillation, also referred to as cryogenic separation, and membrane separation.

The use of such methods for removing carbon dioxide from a fluid stream is extremely complex and expensive.

SUMMARY OF THE INVENTION

It is desirable to have a method of removing carbon dioxide from a fluid stream which operates more efficiently than the methods mentioned above. For this purpose, an embodiment of the invention provides a method of removing carbon dioxide from a fluid stream by a fluid separation assembly comprising:
  a cyclonic fluid separator comprising a throat portion arranged between a converging fluid inlet section and a diverging fluid outlet section and a swirl creating device configured to create a swirling motion of the carbon dioxide containing fluid within at least part of the cyclonic fluid separator, the converging fluid inlet section comprising a first inlet for fluid components and the diverging fluid outlet section comprising a first outlet for carbon dioxide depleted fluid and a second outlet for carbon dioxide enriched fluid;
  a separation vessel having a first section in connection with a collecting tank, the first section being provided with a second inlet connected to the second outlet of the cyclonic fluid separator, and the collecting tank being provided with a third outlet for solidified carbon dioxide;
  the method comprising:
  providing a fluid stream at the first inlet, the fluid stream comprising carbon dioxide;
  imparting a swirling motion to the fluid stream so as to induce outward movement of at least one of condensed components and solidified components within the fluid stream downstream the swirl creating device and to form an outward fluid stream;
  expanding the swirling fluid stream, so as to form components of liquefied carbon dioxide in a meta-stable state within the fluid stream, and induce outward movement of the components of liquefied carbon dioxide in the meta-stable state under the influence of the swirling motion;
  extracting the outward fluid stream comprising the components of liquefied carbon dioxide in the meta-stable state from said cyclonic fluid separator through the second outlet;
  providing the extracted outward fluid stream as a mixture to the separation vessel through the second inlet;
  guiding the mixture through the first section of the separation vessel towards the collecting tank, while providing processing conditions in the first section such that solidified carbon dioxide is formed out of the components of liquefied carbon dioxide in the meta-stable state;
  extracting the solidified carbon dioxide through the third outlet.

In an embodiment, the invention further relates to a fluid separation assembly for removing carbon dioxide from a fluid stream, the fluid separation assembly comprising:
  a cyclonic fluid separator comprising a throat portion arranged between a converging fluid inlet section and a diverging fluid outlet section and a swirl creating device configured to create a swirling motion of the carbon dioxide containing fluid within at least part of the separator, the converging fluid inlet section comprising a first inlet for fluid components and the diverging fluid outlet section comprising a first outlet for carbon dioxide depleted fluid and a second outlet for carbon dioxide enriched fluid;
  a separation vessel having a first section in connection with a collecting tank, the section being provided with a second inlet connected to the second outlet of the cyclonic fluid separator, and the collecting tank being provided with a third outlet for solidified carbon dioxide;
  wherein the fluid separation assembly is arranged to:
  receive a fluid stream comprising carbon dioxide at the first inlet;
  impart a swirling motion to the fluid stream so as to induce outward movement of at least one of condensed components and solidified components within the fluid stream downstream the swirl creating device and to form an outward fluid stream;
  expand the swirling fluid stream, so as to form components of liquefied carbon dioxide in a meta-stable state within the fluid stream, and induce outward movement of the components of liquefied carbon dioxide in the meta-stable state under the influence of the swirling motion;
  extract the outward fluid stream comprising said components of liquefied carbon dioxide in the meta-stable state from the cyclonic fluid separator through the second outlet;
  provide the extracted outward fluid stream as a mixture to the separation vessel through the second inlet;
  guide the mixture through the first section of the separation vessel towards the collecting tank, while providing processing conditions in the first section such that solidified carbon dioxide is formed out of the components of liquefied carbon dioxide in the meta-stable state;
  enable extraction of the solidified carbon dioxide through the third outlet.

Throughout the description, the term "fluid" is used. This term is used to refer to liquid and/or gas.

DESCRIPTION OF THE DRAWINGS

Embodiments of the invention will now be described, by way of example only, with reference to the accompanying schematic drawings in which corresponding reference symbols indicate corresponding parts and in which.

DETAILED DESCRIPTION

Figure 1:
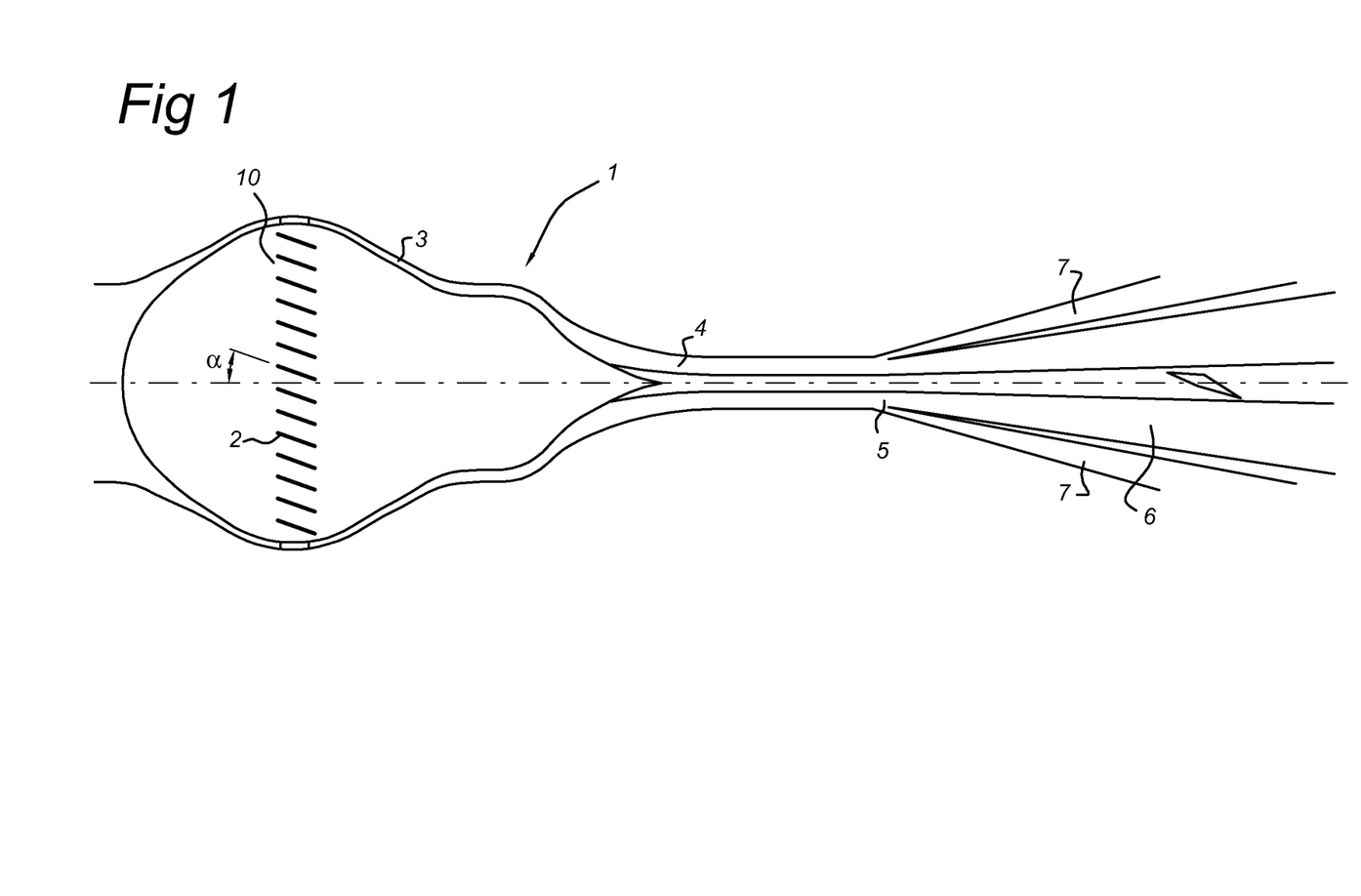
FIG. 1 schematically depicts a longitudinal sectional view of a cyclonic fluid separator that may be used in embodiments of the invention.

FIG. 1 schematically depicts a longitudinal sectional view of a cyclonic fluid separator 1 that may be used in embodiments of the invention. Such a cyclonic fluid separator is described in more detail in international patent application WO03/029739. It must be understood that, in embodiments of the invention, also cyclonic fluid separators of a different type may be used, e.g. a cyclonic fluid separator as described in WO99/01194, WO2006/070019 and WO00/23757.

The cyclonic fluid separator 1 comprises a converging fluid inlet section 3, a diverging fluid outlet section 5 and a tubular throat portion 4 arranged in between the converging fluid inlet section 3 and diverging fluid outlet section 5. The cyclonic fluid separator 1 further comprises a swirl creating device, e.g. a number of swirl imparting vanes 2, configured to create a swirling motion of the fluid within at least part of the cyclonic fluid separator 1.

The converging fluid inlet section 3 comprises a first inlet 10. The diverging fluid outlet section 5 comprises a first outlet 6 and a second outlet 7.

The function of the various components of the cyclonic fluid separator 1 will now be explained with respect to a case in which the cyclonic fluid separator 1 is used to separate carbon dioxide from a fluid stream comprising carbon dioxide in accordance with an embodiment of the invention.

The fluid stream comprising carbon dioxide is fed through the first inlet 10 in the converging fluid inlet section 3. In an embodiment of the invention, the fluid stream comprises a mole percentage carbon dioxide larger than 10%. The swirl imparting vanes 2 create a circulation in the fluid stream and are oriented at an angle α relative to the central axis of the cyclonic fluid separator 1, i.e. the axis around which the cyclonic fluid separator 1 is about rotationally symmetric. The swirling fluid stream is then expanded to high velocities. In embodiments of the invention, the number of swirl imparting vanes 2 is positioned in the throat portion 4. In other embodiments, of the invention, the number of swirl imparting vanes 2 is positioned in the converging fluid inlet section 3.

In embodiments of the invention, the swirling fluid stream has a transonic velocity. In other embodiments of the invention, the swirling fluid stream may reach a supersonic velocity. The expansion is performed rapidly. With respect to an expansion two time scales may be defined.

The first time scale is related to a mass transfer time $t_{eq}$, i.e. a time associated with return to equilibrium conditions. The $t_{eq}$ depends on the interfacial area density in a two-phase system, the diffusion coefficient between the two phases and the magnitude of the departure from equilibrium. The $t_{eq}$ for a liquid-to-solid transition is typically two orders of magnitude larger than for a vapour-to-liquid transition.

The second time scale is related to an expansion residence time $t_{res}$ of the fluid in the device. The $t_{res}$ relates to the average speed of the fluid in the device and the axial length of the device along which the fluid travels. An expansion is denoted as 'rapid' when $$\frac{t_{eq}}{t_{res}} > 1.$$

Due to the rapid expansion which causes a high velocity of the fluid stream, the swirling fluid stream may reach a temperature below 200 K and a pressure below 50% of a pressure at the first inlet 10 of the converging inlet section 3. As a result of aforementioned expansion, carbon dioxide components are formed in a meta-stable state within the fluid stream. In case the fluid stream at the inlet section 3 is a gas stream, the carbon dioxide components will be formed as liquefied carbon dioxide components. In case the fluid stream at the inlet section 3 is a liquid stream, hydrocarbon vapours will be formed whilst the majority of carbon dioxide components remain in liquid form. In the tubular throat portion 4, the fluid stream may be induced to further expand to higher velocity or be kept at a substantially constant speed.

In the first case, i.e. expansion of the fluid stream to higher velocity, aforementioned formation of carbon dioxide components is ongoing and particles will gain mass. Preferably the expansion is extended to a solid coexistence region (region IVa or IVb in FIGS. 3a, 3b). However solidification will be delayed with respect to equilibrium, since the phase transition from liquid to solid is associated with a barrier of the free energy of formation. As will be further discussed with respect to FIGS. 3a, 3b, a portion of the carbon dioxide may solidify.

In case the fluid stream is kept at substantially constant speed, carbon dioxide component formation is about to stop after a defined relaxation time. In both cases, i.e. expansion of the fluid stream to higher velocity and keeping the fluid stream at a substantially constant speed, the centrifugal action causes the carbon dioxide particles to drift to the outer circumference of the flow area adjacent to the inner wall of the housing of the cyclonic fluid separator 1 so as to form an outward fluid stream. In this case the outward fluid stream is a stream of a carbon dioxide enriched fluid, the carbon dioxide components therein being liquefied and/or partly solidified.

Downstream of the tubular throat portion 4, the outward fluid stream comprising the components of carbon dioxide in aforementioned meta-stable state is extracted from the cyclonic fluid separator 1 through the second outlet 7 of the cyclonic fluid separator 1. Other components within the fluid stream not being part of aforementioned outward fluid stream are extracted from the cyclonic fluid separator 1 through first outlet 6 of the cyclonic fluid separator 1.

Figure 2:
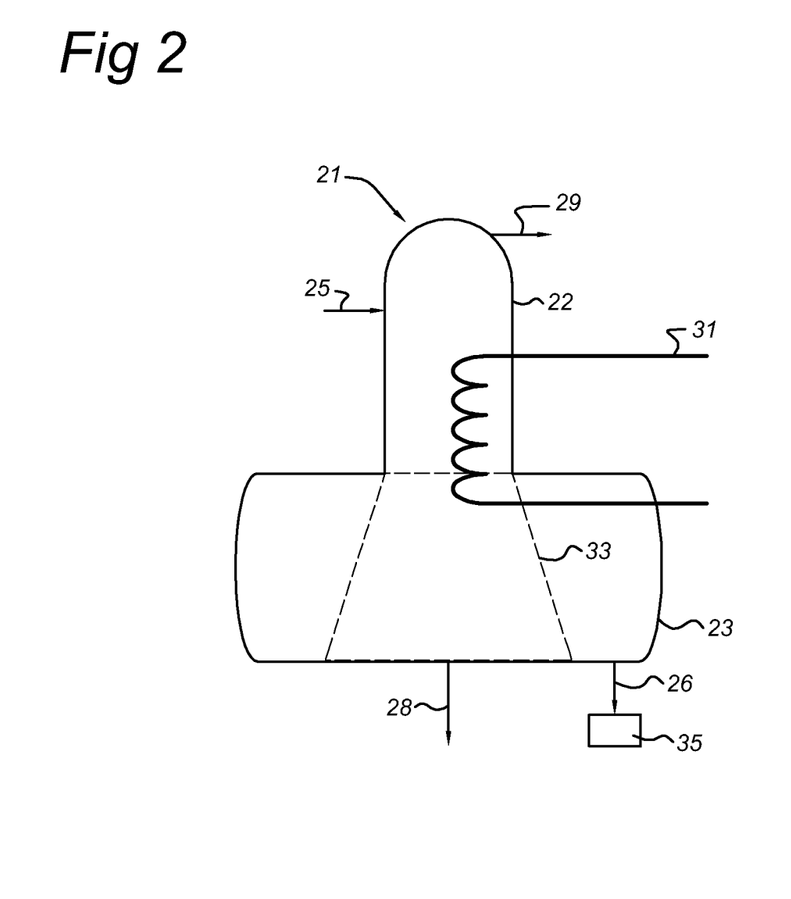
FIG. 2 schematically depicts a cross-sectional view of a separation vessel that may be used in embodiments of the invention.

FIG. 2 schematically depicts a cross-sectional view of a separation vessel 21 that may be used in embodiments of the invention. The separation vessel 21 has a first section, further referred to as tubular section 22, with, in use, a substantially vertical orientation positioned on and in connection with a collecting tank 23. The collecting tank 23 is provided with a third outlet 26 and a fourth outlet 28. The tubular section 22 is provided with a second inlet 25 and a fifth outlet 29. The second inlet 25 is connected to the second outlet 7 of the cyclonic fluid separator 1. In an embodiment, the second inlet 25 is arranged to provide a tangential fluid stream into the separation vessel 21, e.g. the second inlet 25 is arranged tangent to the circumference of the separation vessel 21. The separation vessel 21 further comprises a cooling arrangement, in FIG. 2 schematically represented by reference number 31, and a separation arrangement, in FIG. 2 schematically represented by reference number 33.

The function of the various components of the separation vessel 21 will now be explained with respect to a case in which the separation vessel 21 is used in a method of removing carbon dioxide from a fluid stream in accordance with an embodiment of the invention.

The cooling arrangement 31 is configured to provide a predetermined temperature condition in the separation vessel 21. The temperature condition is such that it enables solidification of the carbon dioxide enriched fluid, which enters the separation vessel 21 through the second inlet 25 as a mixture. In other words, the temperature within the separation vessel 21 should remain below the solidification temperature of carbon dioxide, the latter being dependent on the pressure conditions in the separation vessel 21.

Within the separation vessel 21, a mixture comprising carbon dioxide originating from the second outlet 7 of the cyclonic fluid separator 1 is split in at least three fractions. These fractions are a first fraction of gaseous components, a second fraction of hydrocarbon, predominantly in a liquid state, and a third fraction of carbon dioxide, predominantly in a solid state.

The first fraction is formed by gaseous components which are dragged along with the liquids exiting the second outlet 7. The cooling arrangement 31 is configured to keep the temperature within the separation vessel 21 below the solidification temperature of the fluid. The gaseous components do not contain much carbon dioxide as most carbon dioxide will be dissolved in the mixture liquid, as will be explained in more detail with reference to FIG. 3. The carbon dioxide depleted gaseous components may leave the separation vessel 21 through the fifth outlet 29.

As a result of solidification of carbon dioxide out of the liquid within the mixture, a phenomenon which will be explained in more detail with respect to FIG. 3, the mixture, which no longer holds gaseous components, may be split in a liquid component containing hydrocarbon and a solid component of carbon dioxide by means of a separation arrangement 33. Possible separation arrangements 33 include a gravity separator, a centrifuge and a hydro cyclone. In case a gravity separator is used, it preferably comprises a number of stacked plates. In case a centrifuge is used, it preferably comprises a stacked disc bowl. The separation arrangement 33 in the separation vessel 21 is configured to enable hydrocarbon liquid components to leave the separation vessel 21 through the fourth outlet 28, and to enable solidified carbon dioxide to leave the separation vessel 21 through the third outlet 29.

In an embodiment, the fluid separation assembly further comprises a screw conveyor or scroll type discharger 35 in connection with the third outlet 29. The scroll type discharger 35 is configured to extract the solidified carbon dioxide from the separation vessel 21.

In yet another embodiment, interior surfaces of elements of the fluid separation assembly being exposed to the fluid, i.e. cyclonic fluid separator 1, separation vessel 21 and the one or more tubes or the like connecting the second outlet 7 of the cyclonic fluid separator 1 and the second inlet 25 of the separation vessel 21, are provided with a non-adhesive coating. The non-adhesive coating prevents adhesion of solidified fluid components, i.e. carbon dioxide, on aforementioned interior surfaces. Such adhesion would decrease the efficiency of the fluid separation assembly.

Figure 3A:
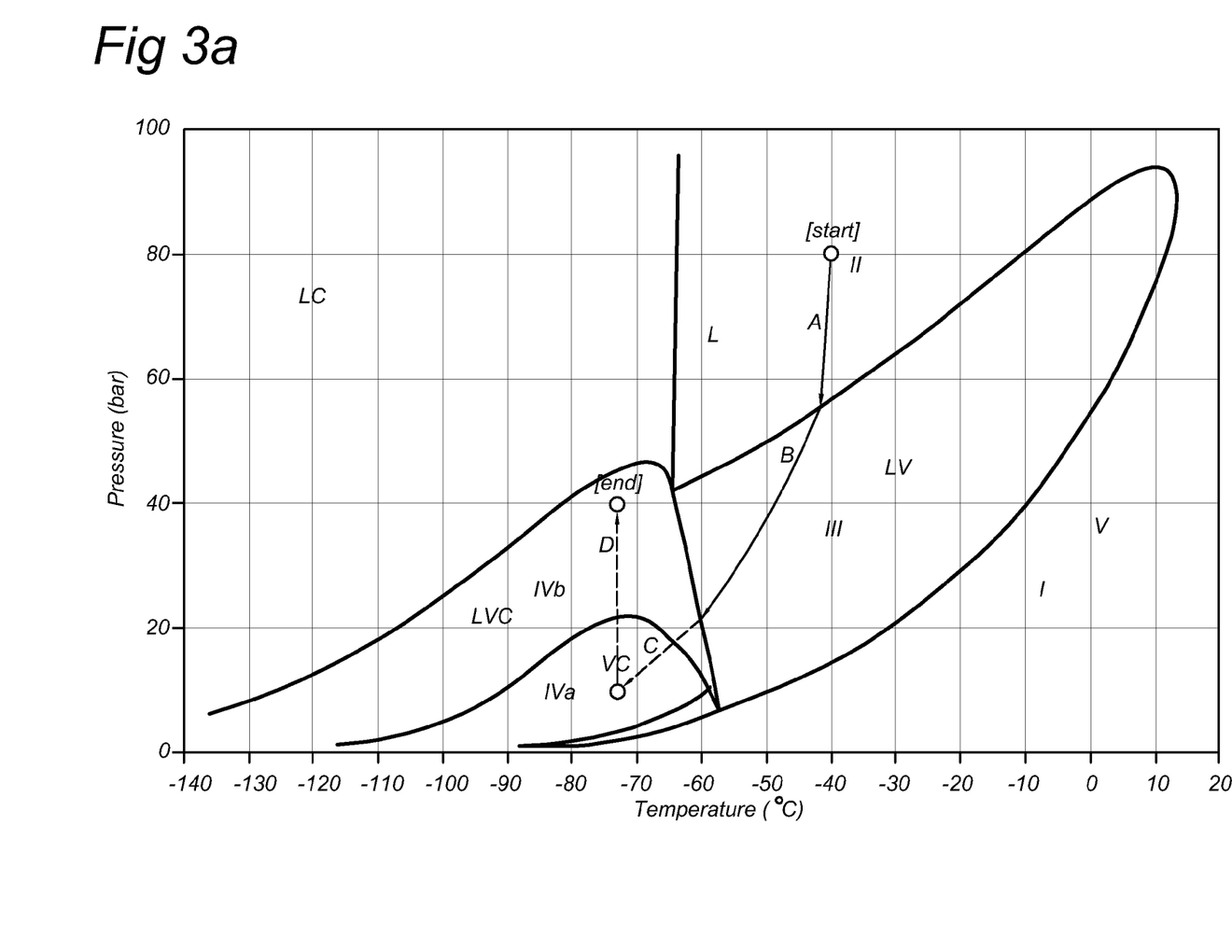
FIGS. 3a, 3b depict an exemplary phase diagram of a natural gas containing carbon dioxide in which schematically different embodiments of the method according to the invention are visualised.
Figure 3B:
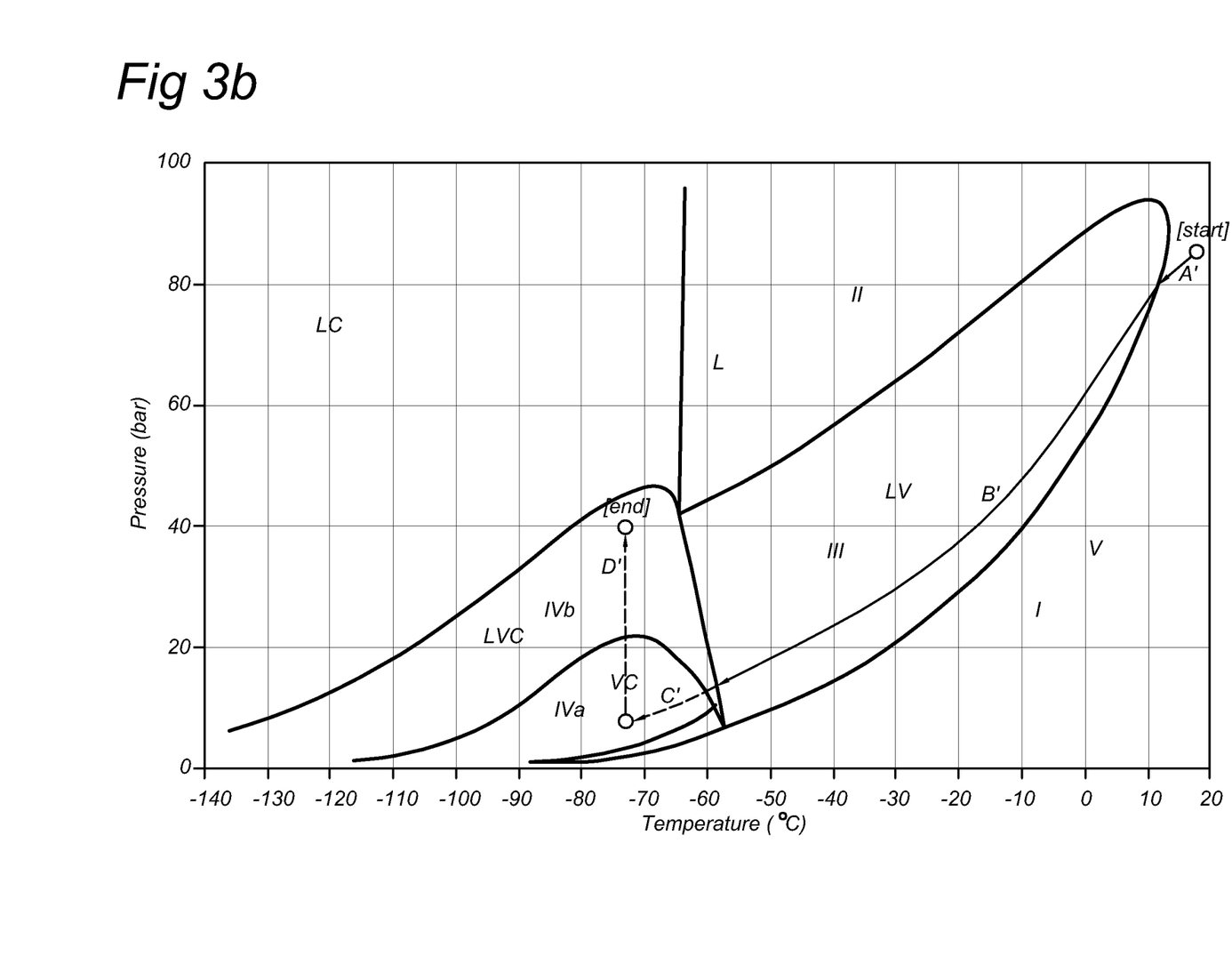

FIGS. 3a, 3b show an exemplary phase diagram of a natural gas containing carbon dioxide in which schematically different embodiments of the method according to the invention are visualised. The phases are represented as a function of pressure in bar and temperature in degrees Celsius. In this particular case, the natural gas contains 71 mol % $CO_2$. Additionally, the natural gas contains 0.5 mol % nitrogen ($N_2$), 0.5 mol % hydrogen sulphide ($H_2S$), 27 mol % C1, i.e. hydrocarbons with a single carbon atom therein, and 1 mol % C2, i.e. hydrocarbons with two carbon atoms therein. The phases are labelled as follows: V=vapour, L=liquid, C=solid $CO_2$. Areas of different coexisting phases are separated by calculated phase boundaries.

In FIG. 3a, the condition of the fluid stream at the first inlet 10 of the cyclonic fluid separator 1 schematically depicted in FIG. 1 corresponds to the coordinate of 80 bar and −40° C., denoted by [START] in the diagram of FIG. 3a. The isentropic trajectory along arrow A is in the liquid region (II), whereas the isentropic trajectory along arrow B is in the vapour/liquid coexistence region (III). As a result of the expansion in the coexistence region (III), a meta-stable state in the liquid/vapour regime may be reached while following arrow B, until phase transition occurs at a certain super saturated condition. The resulting evaporation process will then restore equilibrium conditions. Further expansion of the fluid stream along the arrow C may result in the fluid to reach a meta-stable state in the vapour/liquid/solid coexistence region (IVb) or in the vapour/solid coexistence region (IVa). Even though along the expansion trajectory denoted with arrow C, a phase transition to form solid carbon dioxide will not occur instantaneously, the carbon dioxide fraction in the vapour will deplete, while more carbon dioxide dissolves in the liquid. In embodiments of the invention, the fluid stream may be separated by a cyclonic fluid separator, e.g. a cyclonic fluid separator as described in International patent application WO2006/070019, in a carbon dioxide enriched fluid stream and a carbon dioxide depleted fluid stream at the end of the expansion trajectory denoted by arrow C. The separated, carbon dioxide enriched fluid is in a state of non-equilibrium, which will only last for a limited period of time, in the order of 10 milliseconds. Therefore the carbon dioxide enriched fluid is recompressed in the second outlet 7 of the diverging outlet section 5 of the cyclonic fluid separator 1 and discharged via the second outlet 7 to the separation vessel 21, preferably within said time period that the meta-stable state exists. A breakdown of said meta-stable state results in solid formation which in practice means that dissolved carbon dioxide in the liquid solidifies. As a result of the solidification of carbon dioxide, latent heat is released causing the temperature of the fluid to rise. Therefore the separated, carbon dioxide enriched fluid entering the separation vessel 21, may be cooled in order to ensure that the fluid remains in the vapour/solid or vapour/liquid/solid coexistence region. Said process of cooling and recompressing the carbon dioxide enriched fluid is denoted by arrow D. In embodiments of the invention, the process of further solidification takes place in the separation vessel 21. The state of the fluid at a newly developed equilibrium within the separation vessel 21 is denoted as [END]. Solidified carbon dioxide is removed through the third outlet 26 as described above.

In FIG. 3b, the condition of the fluid stream at the first inlet 10 of the cyclonic fluid separator 1 schematically depicted in FIG. 1 corresponds to the coordinate of about 85 bar and about 18° C., denoted by [START] in the diagram of FIG. 3b. The isentropic trajectory along arrow A' is in the vapour region (I), whereas the isentropic trajectory along arrow B' is in the vapour/liquid coexistence region (III). As a result of the expansion in the coexistence region (III), a meta-stable state in the liquid/vapour regime may be reached while following arrow B, until phase transition occurs at a certain supercooled condition. The resulting condensation process will then restore equilibrium conditions. Further expansion of the fluid stream along the arrow C' may result in the fluid to reach a meta-stable state in the vapour/liquid/solid coexistence region (IVb) or in the vapour/solid coexistence region (IVa). Even though along the expansion trajectory denoted with arrow C', a phase transition to form solid carbon dioxide will not occur instantaneously. In embodiments of the invention, the fluid stream is separated by the cyclonic fluid separator 1 in a carbon dioxide enriched fluid stream and a carbon dioxide depleted fluid stream at the end of the expansion trajectory denoted by arrow C', a process described above with reference to FIG. 1. Additionally, further details with respect to such a process may be found in international application WO03/029739. The separated, carbon dioxide enriched fluid is in a state of non-equilibrium, which will only last for a limited period of time, in the order of 10 milliseconds. Therefore the carbon dioxide enriched fluid is recompressed in the diverging outlet section 5 of the cyclonic fluid separator 1 and discharged via the second outlet 7 to the separation vessel 21, preferably within said time period that the meta-stable state exists. A breakdown of said meta-stable state results in solid carbon dioxide formation from the liquefied part of the fluid stream. As a result of the solidification of carbon dioxide, latent heat is released causing the temperature of the fluid to rise. Therefore the separated, carbon dioxide enriched fluid entering the separation vessel 21, may be cooled in order to ensure that the fluid remains in the vapour/solid or vapour/liquid/solid coexistence region. Said process of cooling and recompressing the carbon dioxide enriched fluid is denoted by arrow D'.

In embodiments of the invention, the process of solidification takes place in the separation vessel 21. The state of the fluid at a newly developed equilibrium within the separation vessel 21 is denoted as [END]. Again, solidified carbon dioxide is removed through the third outlet 26 as described above.

While specific embodiments of the invention have been described above, it will be appreciated that the invention may be practiced in another way than described. The description above is intended to be illustrative, not limiting. Thus, it will be apparent to a person skilled in the art that modifications may be made to embodiments of the invention as described without departing from the scope of the claims set out below.

The invention claimed is:

1. Method of removing carbon dioxide from a fluid stream by a fluid separation assembly comprising:
   a cyclonic fluid separator comprising a throat portion arranged between a converging fluid inlet section and a diverging fluid outlet section and a swirl creating device configured to create a swirling motion of the carbon dioxide containing fluid within at least part of the cyclonic fluid separator, the converging fluid inlet section comprising a first inlet for fluid components and the diverging fluid outlet section comprising a first outlet for carbon dioxide depleted fluid and a second outlet for carbon dioxide enriched fluid;
   a separation vessel having a first section in connection with a collecting tank, said first section being provided with a second inlet connected to said second outlet of said cyclonic fluid separator, and said collecting tank being provided with a third outlet for solidified carbon dioxide;
the method comprising:
   providing a fluid stream at said first inlet, wherein said fluid stream comprises a mole percentage carbon dioxide larger than 10%;
   imparting a swirling motion to the fluid stream so as to induce outward movement of at least one of condensed components and solidified components within the fluid stream downstream the swirl creating device and to form an outward fluid stream, wherein the swirling fluid stream reaches a transonic or supersonic velocity;
   expanding the swirling fluid stream, so as to form components of liquefied carbon dioxide in a meta-stable state within said fluid stream, and induce outward movement of said components of liquefied carbon dioxide in said meta-stable state under the influence of said swirling motion;
   extracting the outward fluid stream comprising said components of liquefied carbon dioxide in said meta-stable state from said cyclonic fluid separator through said second outlet;
   providing said extracted outward fluid stream as a mixture to said separation vessel through said second inlet;
   guiding said mixture through said first section of said separation vessel towards said collecting tank, while providing processing conditions in said first section such that solidified carbon dioxide is formed out of said components of liquefied carbon dioxide in said meta-stable state;
   extracting the solidified carbon dioxide through said third outlet.

2. Method according to claim 1, wherein said first section of the separation vessel is further provided with a fourth outlet, and said method further comprises extracting carbon dioxide depleted gaseous components through said fourth outlet.

3. Method according to claim 1, wherein said collecting tank is further provided with a fifth outlet, and said method further comprises extracting hydrocarbon liquid components through said fifth outlet.

4. Method according to claim 1, wherein said separation vessel further comprises a cooling arrangement configured to provide a predetermined temperature condition therein, said temperature condition enabling solidification of the carbon dioxide enriched fluid.

5. Method according to claim 1, wherein said fluid separation assembly further comprises a scroll type discharger in connection with said third outlet, and said extracting the solidified carbon dioxide is performed by conveying by means of said scroll type discharger.

6. Method according to claim 1, wherein said expanding of the swirling fluid stream is such that the swirling fluid stream reaches supersonic velocity.

7. Method according to claim 6, wherein said expanding is further such that a temperature below 200 K is reached.

8. Method according to claim 6, wherein said expanding is further such that a pressure is reached below 50% of a pressure at the first inlet of the cyclonic fluid separator.

9. Method according to claim 1, wherein said swirl creating device comprises a number of swirl imparting vanes.

10. Method according to claim 9, wherein said number of swirl imparting vanes is positioned in said throat portion.

11. Method according to claim 9, wherein said number of swirl imparting vanes is positioned in said inlet section.

12. Method according to claim 1, wherein interior surfaces of elements of the fluid separation assembly being exposed to the fluid, are provided with a non-adhesive coating.

13. Method according to claim 1, wherein said providing said outward fluid stream as a mixture to said separation vessel through said second inlet is arranged such that a tangential fluid stream is provided.

14. Fluid separation assembly for removing carbon dioxide from a fluid stream, the fluid separation assembly comprising:
- a cyclonic fluid separator comprising a throat portion arranged between a converging fluid inlet section and a diverging fluid outlet section and a swirl creating device configured to create a swirling motion of the carbon dioxide containing fluid within at least part of the separator, the converging fluid inlet section comprising a first inlet for fluid components and the diverging fluid outlet section comprising a first outlet for carbon dioxide depleted fluid and a second outlet for carbon dioxide enriched fluid;
- a separation vessel having a first section in connection with a collecting tank, said section being provided with a second inlet connected to said second outlet of said cyclonic fluid separator, and said collecting tank being provided with a third outlet for solidified carbon dioxide;

wherein said fluid separation assembly is arranged to:
- receive a fluid stream comprising carbon dioxide at said first inlet, wherein said fluid stream comprises a mole percentage carbon dioxide larger than 10%;
- impart a swirling motion to the fluid stream so as to induce outward movement of at least one of condensed components and solidified components within the fluid stream downstream the swirl creating device and to form an outward fluid stream, wherein the swirling fluid stream reaches a transonic or supersonic velocity;
- expand the swirling fluid stream, so as to form components of liquefied carbon dioxide in a meta-stable state within said fluid stream, and induce outward movement of said components of liquefied carbon dioxide in said meta-stable state under the influence of said swirling motion;
- extract the outward fluid stream comprising said components of liquefied carbon dioxide in said meta-stable state from said cyclonic fluid separator through said second outlet;
- provide said extracted outward fluid stream as a mixture to said separation vessel through said second inlet;
- guide said mixture through said first section of said separation vessel towards said collecting tank, while providing processing conditions in said first section such that solidified carbon dioxide is formed out of said components of liquefied carbon dioxide in said meta-stable state;
- enable extraction of the solidified carbon dioxide through said third outlet, wherein said number of swirl imparting vanes is positioned in said inlet section and wherein said second inlet of said separation vessel is arranged tangent to the circumference of the separation vessel.

15. Fluid separation assembly according to claim 14, wherein said first section is further provided with a fourth outlet, said fourth outlet being configured to enable extraction of carbon dioxide depleted gaseous components.

16. Fluid separation assembly according to claim 15, wherein said collecting tank is further provided with a fifth outlet, said fifth outlet being configured to enable extraction of hydrocarbon liquid components.

17. Fluid separation assembly according to claim 14, wherein said separation vessel further comprises a cooling arrangement configured to provide a predetermined temperature condition therein, said temperature condition enabling solidification of a carbon dioxide enriched fluid.

18. Fluid separation assembly according to claim 14, wherein said fluid separation assembly further comprises a scroll type discharger in connection with said third outlet, said scroll type discharger being configured to enable extraction of said solidified carbon dioxide through said third outlet by conveying.

19. Fluid separation assembly according to claim 18, wherein said number of swirl imparting vanes is positioned in said throat portion.

20. Fluid separation assembly according to claim 14, wherein said swirl creating device comprises a number of swirl imparting vanes.

21. Fluid separation assembly according to any one of claim 14, wherein interior surfaces of elements of the fluid separation assembly being exposable to the fluid, are provided with a non-adhesive coating.

* * * * *